United States Patent [19]

Blanc et al.

[11] 4,094,369

[45] June 13, 1978

[54] MONITORING DEVICE FOR NUCLEAR REACTOR CONTROL RODS

[75] Inventors: Raymond Blanc; Roland Jacquelin, both of Manosque, France

[73] Assignee: Commissariat a l'Energie Atomique, Paris, France

[21] Appl. No.: 620,416

[22] Filed: Oct. 7, 1975

[30] Foreign Application Priority Data

Oct. 8, 1974  France ................................ 74 33852

[51] Int. Cl.² ........................ G01G 19/14; G01G 3/14; G21C 17/10
[52] U.S. Cl. ................................ 177/147; 176/19 R; 176/36 R; 177/211
[58] Field of Search ................... 177/211, 147, 66, 45; 176/36 R, 19 R

[56] References Cited

U.S. PATENT DOCUMENTS

| | | | |
|---|---|---|---|
| 2,917,445 | 12/1959 | Oakes | 177/232 X |
| 2,940,308 | 6/1960 | Calhoun | 177/147 X |
| 3,005,332 | 10/1961 | McClintock | 73/1 B |
| 3,439,761 | 4/1969 | Laimins | 177/211 |

*Primary Examiner*—Joseph W. Hartary
*Attorney, Agent, or Firm*—Cameron, Kerkam, Sutton, Stowell & Stowell

[57] ABSTRACT

Weighing of each control rod and at least the moving portion of the control rod drive mechanism is carried out in continuous operation by means of an assembly comprising at least one strain gage mounted in a circuit for measuring the electrical resistance of the gage according to the change in length which is a function of the weight being measured.

9 Claims, 12 Drawing Figures

MONITORING DEVICE FOR NUCLEAR REACTOR CONTROL RODS

This invention relates to a device for continuously monitoring the correct state of operation of nuclear reactor control rods or assemblies and of the mechanisms which actuate said rods, especially when direct access to these components is difficult by reason of their position with respect to the other reactor structures and the atmosphere which surrounds these latter.

The primary object of the invention is to detect any faulty operation of reactivity control systems, for example any fault condition which may arise from abnormal friction or jamming of control rods in the control rod guide tubes usually employed for guiding each control rod during displacements carried out under the action of associated drive mechanisms, or alternatively to indicate any resistance or friction set up in the drive mechanisms themselves as a result of seizure of rotating parts or of faulty resetting of braking systems provided for the moving portions of said mechanisms. A further aim of the invention is to detect the precise instant at which the fast drop takes place in a safety operation. In this case the systems usually employed and comprising relay elements such as for example microswitches or the like are dispensed with since the operation of these latter is liable to become unreliable by reason of the environmental conditions in a reactor.

To this end, the device under consideration essentially comprises an assembly for the continuous weighing of the control rod and at least the moving portion of the rod-position control mechanism, comprising at least one strain gage mounted in a circuit for measuring the electrical resistance of said gage which varies with the elongation or percentage extension, said elongation being in turn a function of the measured weight.

In a first embodiment of the invention in which the control rod is associated with a drive mechanism of the screw-and-nut type, said mechanism is carried on a fixed reference plane by a supporting head applied against beams inset at a stationary extremity with respect to the reference plane and subjected to bending stress under the action of the weight of the control rod and drive mechanism, each beam being fitted with at least one strain gage extending in the longitudinal direction of said beam between the inset extremity thereof and the point of application of the supporting head against the other extremity.

As an advantageous feature, each beam has a solid extremity for insetting of said beam with respect to the reference plane, a central portion having a triangular profile for ensuring isoflexion of the strain gages and a free extremity remote from the solid extremity on which the supporting head is carried by a ball, the force produced by the weight of the control rod and of its drive mechanism and applied to the beam being thereby established in an accurate manner.

The strain gages are preferably of the type comprising etched grids of metal foil protected by insulating sheaths and are bonded to at least one face of the central portion of the beams. In this embodiment, the strain gages are preferably four in number on each beam, said beams being in turn three in number and uniformly spaced around the supporting head. The four gages on each beam are mounted as a bridge in the measuring circuit.

In another embodiment in which the control rod is associated with a drive mechanism of the rack and pinion type, the driving shaft of the pinion is equipped with an assembly for measuring the torque exerted by the weight of the control rod and of the toothed rack. The torque-measuring assembly can be mounted upstream or downstream of a clutch unit provided between the pinion and a driving motor. In this alternative embodiment, the strain gages of the etched metal-foil grid type are also four in number and bonded to the pinion shaft at 45° with respect to two generator-lines so as to be in oppositely-facing relation in pairs and to eliminate the effects of bending and tensile stresses, the strain gages being mounted as a bridge in the measuring circuit. In the same alternative embodiment, the strain gages are connected to slip-rings fitted on the shaft and associated with sliding or fluid contacts on said slip-rings. Measurement of torque can also be carried out by means of a mutual-inductance commutator.

Further properties of a control-rod monitoring device as constructed in accordance with the invention will now become apparent from the following description of a number of exemplified embodiments which are given by way of indication but not in any limiting sense, reference being had to the accompanying drawings, wherein:

Figure 1:
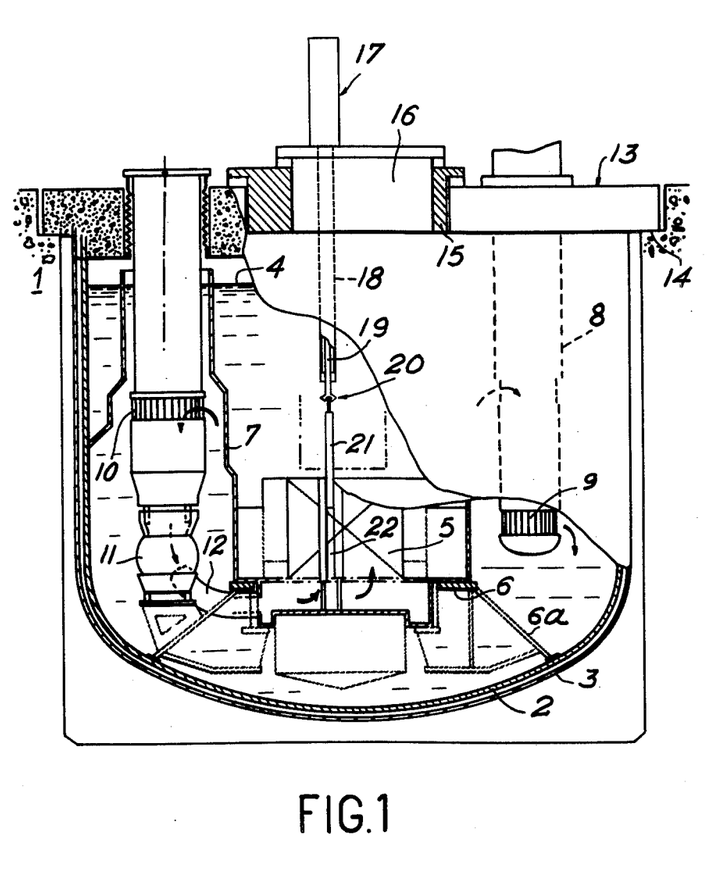
FIG. 1 is a diagrammatic fragmentary transverse sectional view of a nuclear reactor and especially a fast reactor in which the control rod drive mechanisms are equipped with a monitoring device in accordance with the invention.

In FIG. 1, the reference numeral 1 designates a fast reactor containment structure having thick walls, especially of concrete, which delimit a central vault and two coaxial vessels 2 and 3 respectively which are placed within said vault. The vessel 2 or main reactor vessel contains a suitable volume of liquid coolant, the top level of said coolant within the vessel being shown diagrammatically at 4. The reactor core 5 is immersed beneath the level of liquid metal within the interior of the main vessel 2. Said reactor core rests on a diagrid 6 which is in turn applied against the bottom wall of the main vessel 2 by means of a diagrid support structure 6a which is rigidly fixed to the diagrid 6. Said support structure is also provided with an extension within the main vessel 2 in the form of a lateral shell 7 which delimits a second enclosure or primary vessel within said main vessel. Said primary vessel is intended to collect the circulating sodium as this latter leaves the reactor core 5 after having passed upwards through this latter in contact with the reactor core fuel assemblies. Heat exchangers designated schematically by the reference numeral 8 and uniformly spaced around the reactor core 5 are mounted outside the primary vessel 7 but inside the main vessel 2, the function of said heat exchangers being to permit the hot sodium to yield the heat gained to a secondary fluid. The cooled sodium is then returned into the main reactor vessel 2 through discharge openings 9 at the base of said heat exchangers and is then recirculated through the inlet vents 10 of circulating pumps 11 which discharge said sodium through large-section ducts 12 beneath the reactor diagrid 6 in order to ensure a further passage of coolant within the reactor core and continuous circulation through this latter.

The top portions of the containment structure 1 and the vessels 2 and 3 are closed by a horizontal reactor vault roof 13 which is supported on a corbel 14 formed in the containment structure 1. In accordance with customary practice, said vault roof is provided above the reactor core 5 with an assembly of two rotating shield plugs 15 and 16 respectively which are mounted eccentrically with respect to each other. The successive movements of rotation of said shield plugs ensure that different elements or mechanisms carried by these latter are suitably positioned above the reactor core. These mechanisms include in particular actuating devices for the reactor control and safety rods, one of said devices being shown diagrammatically in FIG. 1 and designated by the reference numeral 17. A mechanism of this type passes through the shield plug 16 within the thickness of the reactor vault roof 13 and has an extension in the form of a guide tube 18 for a support sleeve 19, the lower end of which is fitted with a holding element 20. Said element serves to engage and grip the head of a control rod which is constituted in this example by an absorber element 21 slidably mounted within a guide tube 22 which is provided within the reactor core. Said mechanism 17 is designed in particular to ensure either a variable and controlled displacement of the absorber element 21 so as to permit insertion of this latter into the reactor core to a greater or lesser extent and to permit control of the reaction within the core by changing the reactivity or alternatively by releasing the holding element 20 or a part of the mechanism 17 to cause abrupt insertion of said absorber element 21 under the action of gravity in order to initiate emergency shutdown or stopping of the reaction.

Figure 2:
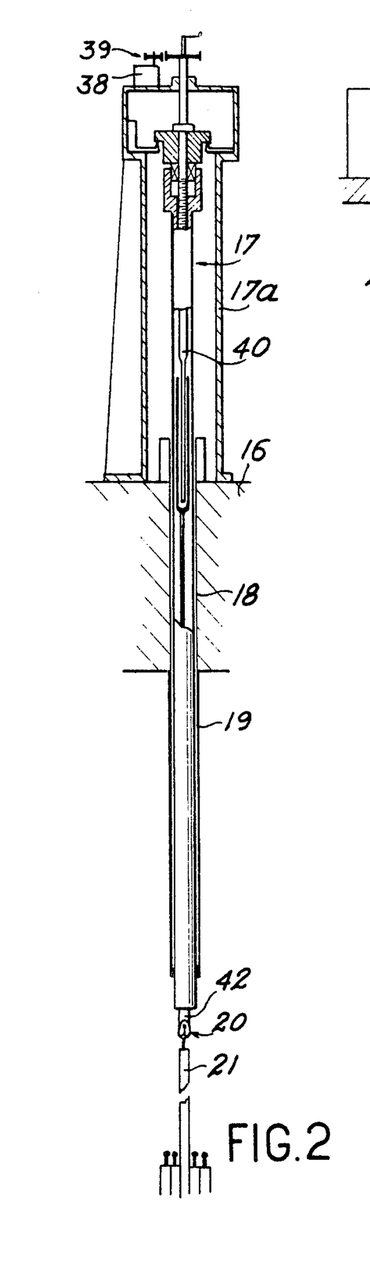
FIG. 2 is a sectional view to a larger scale showing a control rod and its drive mechanism.
Figure 3:
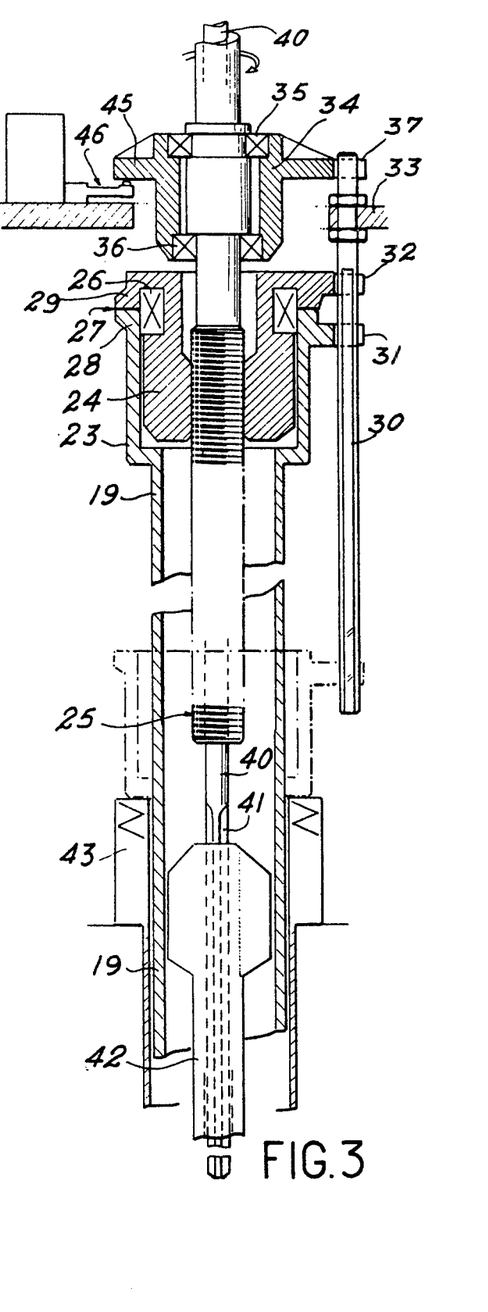
FIG. 3 is a sectional view to a larger scale showing the upper portion of the control rod drive mechanism illustrated in FIG. 2.

In the example of construction illustrated in FIGS. 2 and 3, the top portion of the support sleeve 19 of the absorber element has an extension in the form of a tubular head-piece 23 in which is mounted a nut 24 in cooperating relation with an actuating screw 25. Said screw is secured against translational motion but driven in rotation in such a manner as to ensure that its motion initiates the upward or downward displacement of the nut 24. Said nut is normally coupled to the support sleeve 19 as a result of the magnetic attraction produced by an electromagnet 26 carried by the nut 24; the lines of flux of said electromagnet are closed across an air-gap 27 which forms a separation between on the one hand the top face 28 of the head-piece 23 and on the other hand an annular flange 29 of the nut which is placed in oppositely-facing relation. The nut 24 and the sleeve 19 which is thus connected to this latter are capable of moving freely in translation and guided during this movement by two rods such as the rod 30 which traverses two rings 31 and 32 carried respectively by the head-piece and the nut. Said rod 30 is stationarily fixed with respect to a reference plane materialized by a horizontal plate 33 which is connected to the casing 17a of the mechanism 17 and which is intended in accordance with the invention to support the assembly constituted by said mechanism and the absorber element actuated by this latter. Rotational motion of the screw 25 takes place within a bearing support casing 34 on ball-bearings 35 and 36, said support casing being also secured against rotation by means of a lateral ring 37 engaged on the stationary rod 30. Said screw is driven in rotation by means of a motor 38 and a reduction-gear unit comprising pinions 39 carried by the casing 34. Finally, the screw 25 is traversed axially by a pin 40, the end portion of which is provided with longitudinal splines 41 in cooperating relation with a plunger 42. The lower end of said plunger is connected to the holding element 20 (shown in FIG. 2) of the tong-unit type which engages the head of the absorber element 21. The movement of rotation of the pin 40 which is imparted by said splines 41 to the plunger 42 makes it possible to actuate the element 20 in the direction of opening by means of a transmission system (not shown in the drawings).

Figure 2A:
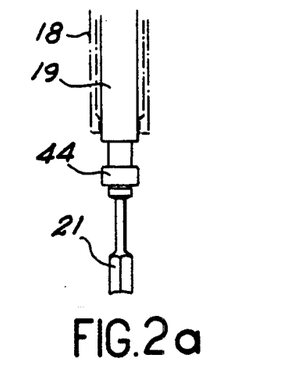
FIG. 2a illustrates an alternative embodiment of a detail of the control rod in accordance with FIG. 2.

During normal operation of the reactor, the position of the absorber element 21 with respect to its guide tube 22 (shown in FIG. 1) within the reactor core is determined by the combined action of the screw 25 and of the nut 24 which produces action on the travel of the support sleeve 19. In the event of an accident condition which entails the need to stop the reaction, a fast drop of the absorber element 21 is achieved by turning-off the electromagnet 26. The head-piece 23 of the sleeve 19 is thus released from the screw 24 and finally stops on a casing 43 provided at the level of the reactor vault roof 13, for example. During this movement, the plunger 42 follows the support sleeve 19 and the absorber element can be released from its holding member 20 by actuating the pin 40 at the end of travel. By way of alternative and as shown in FIG. 2a, the holding element mounted at the extremity of the support sleeve 19 can be constructed by means of an electromagnet 44 or by means of any other suitable device.

In accordance with the invention, the assembly constituted by the absorber element and its drive mechanism is weighed continuously so as to permit detection of any fault condition which is liable to take place during operation and results from abnormal friction in the movements of the different moving parts of said assembly and also in order to permit accurate determination of the precise instant at which the absorber element is released from its support sleeve in the event of a safety drop. To this end, the bearing support casing 34 of the screw 25 which forms a supporting head has a flat lateral extension 45 and this latter extends parallel to the plate 33 which materializes the fixed reference plane of the system and is supported on this latter by means of three beams 46 arranged at uniform intervals around the bearing support casing, one of said beams being illustrated to a larger scale in FIG. 4.

Figure 4:
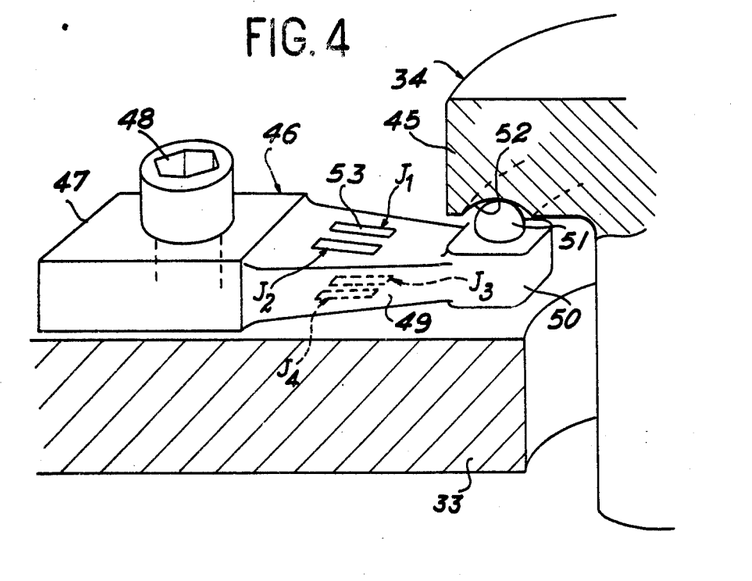
FIG. 4 is a detail view in perspective and partly in cross-section illustrating a beam for supporting the control rod drive mechanism in accordance with FIG. 1 and showing in particular the method adopted for mounting strain gages on said beam.

Each beam 46 has a first solid extremity 47 which is stationarily fixed by rigid insetting in the plate 33 by means of studs 48, a central portion 49 having a substantially triangular profile when looking from above and a rectangular cross-section. Finally, each beam has a second free extremity 50 forming a support for a ball 51 on which the extension 45 of the bearing support casing 34 rests directly, said extension being provided with a bearing groove 52 opposite to said ball. By virtue of these arrangements, the force produced by the weight of the absorber element and drive mechanism is applied to the free extremities 50 of the beams 46, the point of application of said force being accurately located by means of the bearing ball 51. On each beam 46 are mounted strain gages 53 which are preferably four in number and designated by the references $J_1$ to $J_4$, said strain gages being disposed in spaced relation on each beam in the longitudinal direction of this latter and respectively in pairs on either the top or bottom faces of the central portion 49, the triangular profile of which ensures isoflexion of said strain gages as a result of the force produced by the weight applied to the balls 51.

Figure 5:
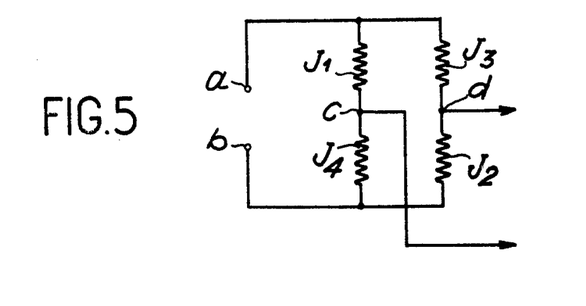
FIG. 5 is a schematic circuit diagram showing the electrical connection of the strain gages.

As illustrated in FIG. 5, the four strain gages $J_1$ to $J_4$ of any one beam 46 are mounted in a measuring bridge connected by means of the terminals $a$ and $b$ to an electric power supply, the signal produced by a variation in the electrical resistance of a certain number of said gages as a result of their elongation in particular being collected between the terminals $c$ and $d$. Under these conditions, any variation in weight carried by the beam in fact results in a variation in length of the strain gages which is different according as said gages are located on the top face of the central portion 49 or on its bottom face and consequently in unbalance of the bridge. This makes it possible in particular to detect any defect in the operation of the drive mechanism and in particular any jamming or friction as well as any resistance to free displacement of the absorber element associated with said mechanism. It is worthy of note that the device makes it possible a fortiori to determine the exact instant at which the absorber element is released in the event of an abrupt safety drop.

As an advantageous feature, the strain gages are of the type comprising etched grids of metal foil and are bonded to the faces of each beam, with the result that the limited travel of this latter is nevertheless sufficient to permit the emission of a representative signal. Preferably, the strain gages are themselves suitably protected by means of an insulating sheath of the polyimide type which ensures electrical insulation as well as protection against moisture and against possible impacts.

The bridge connection of the four strain gages associated with each beam has the further object of eliminating the influence of junction connections, of reducing parasitic effects resulting either from tensile or torsional stress on the beam itself or from a variation in electrical resistance of said gages caused by a temperature variation in their environment and finally of increasing the sensitivity of measurement. In fact, said parasitic variations strain all the gages in the same direction and the same applies to a torsional effort, in which case, each pair on the one hand of gages $J_1$ and $J_4$ and on the other hand $J_2$ and $J_3$ is subjected to the same deformation.

Figure 6:
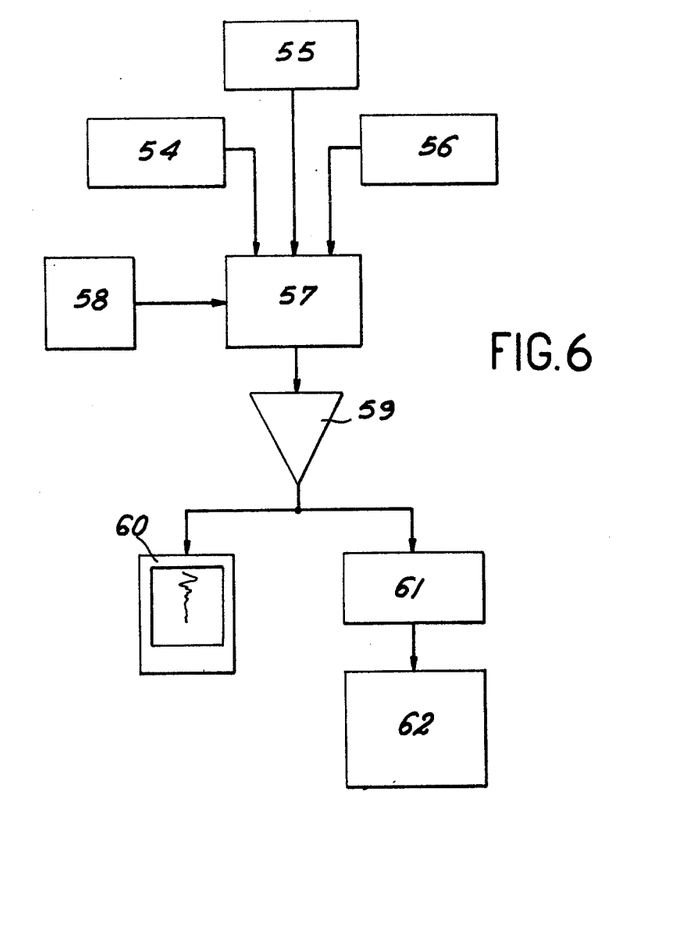
FIG. 6 is a schematic diagram showing the system of connection of all the strain gages associated with the device in accordance with FIG. 2.

FIG. 6 illustrates an example of assembly of the different strain gages on the three supporting beams provided in the alternative embodiment of FIGS. 2 and 3, said gages being disposed at angular intervals of 120° about the axis of the actuating screw. The signals delivered by the measuring bridges 54, 55 and 56 via the four gages carried by each of the three beams are transmitted to a summing and balancing device 57 connected to a power supply 58. After amplification at 59, the resultant signal is on the one hand recorded in a reading device 60 which can be directly graduated in forces after calibration and on the other hand transmitted to an analog-to-digital converter 61 which can in turn be associated with a computer 62 for processing said signal at a location which is very distant from the measurement location such as, for example, a control room or a computing center.

Figure 7:
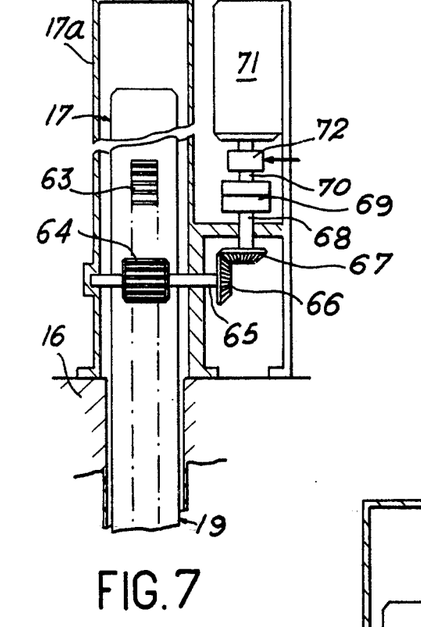
FIG. 7 is a diagrammatic sectional view of another alternative embodiment of a control rod drive mechanism.

In another embodiment of the monitoring device shown in FIG. 7, the upper extremity of the control rod operating sleeve 19 is provided directly with a toothed rack 63 engaged with a driving pinion 64 which is mounted within the casing 17a. Said pinion 64 is carried by a shaft 65, a bevel-tooth pinion 66 disposed in meshing relation with a second pinion 67 being mounted at the end of said shaft. The shaft 68 of said pinion 67 is coupled to a clutch unit 69 operated by the shaft 70 of a driving motor 71, the device for measurement and control of weighing of the control rod and of the moving portion (toothed rack and support sleeve) of its actuating mechanism being represented diagrammatically by the reference 72. By way of alternative and as illustrated in FIG. 8, the device 72 can be provided directly on the shaft 65 of the driving pinion 64 downstream of the clutch unit (not shown) together with the motor 71.

Figure 8:
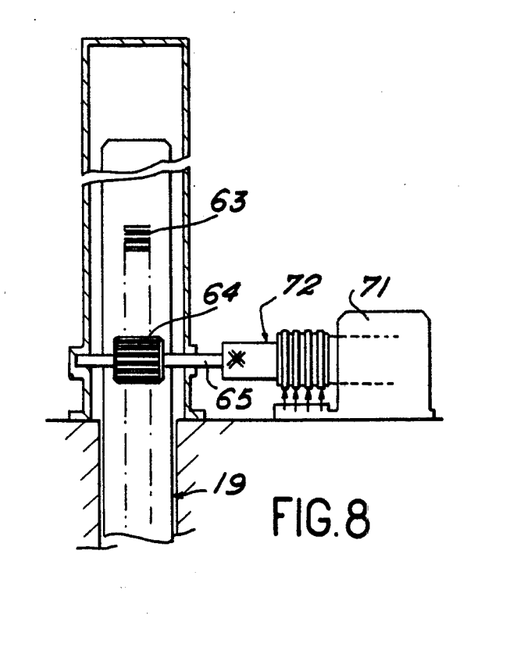
FIG. 8 illustrates a further alternative embodiment.
Figure 9:
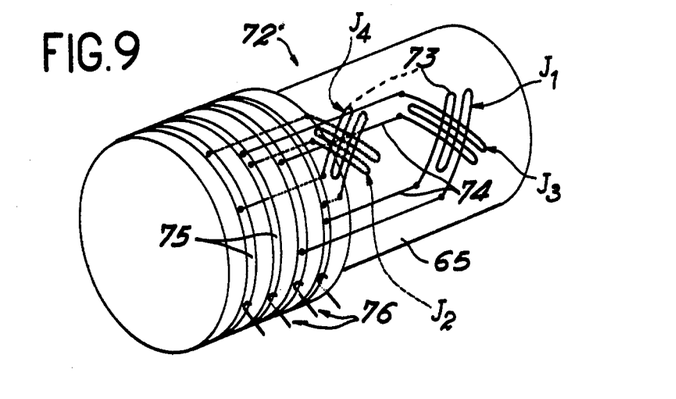
FIG. 9 is a detail view showing the assembly of strain gages in a torque-measuring unit adapted to the embodiments illustrated in FIGS. 7 and 8.

FIG. 9 shows a particular embodiment of the measuring device 72 which is more especially applied in the alternative forms shown in FIGS. 7 and 8. In this case, said device makes it possible to detect variations in the weight of the moving system formed by the control rod and the parts of its actuating mechanism by measuring the torque exerted on the shaft of the pinion 64 which actuates the toothed rack 63. To this end, the device comprises strain gages 73 of the etched metal-foil grid type which are bonded to the shaft 65 or to a sleeve which is coaxial with this latter at an angle of 45° with respect to a generator-line of said shaft and placed in opposite relation in pairs on each side of this latter so as to eliminate any possible bending and tensile stresses. Furthermore, in order to secure freedom from the effects of temperature, the wiring of the strain gages 73 is arranged on the bridge principle by means of leads 74 connected to slip-rings 75 which cooperate with sliding contacts 76. The supply of the device and of the signal delivered by the strain gages thus pass from the shaft to a stationary portion of the mechanism and can be processed by a measuring installation of the type employed in the example of construction as described earlier and illustrated in FIG. 6.

Figure 10:
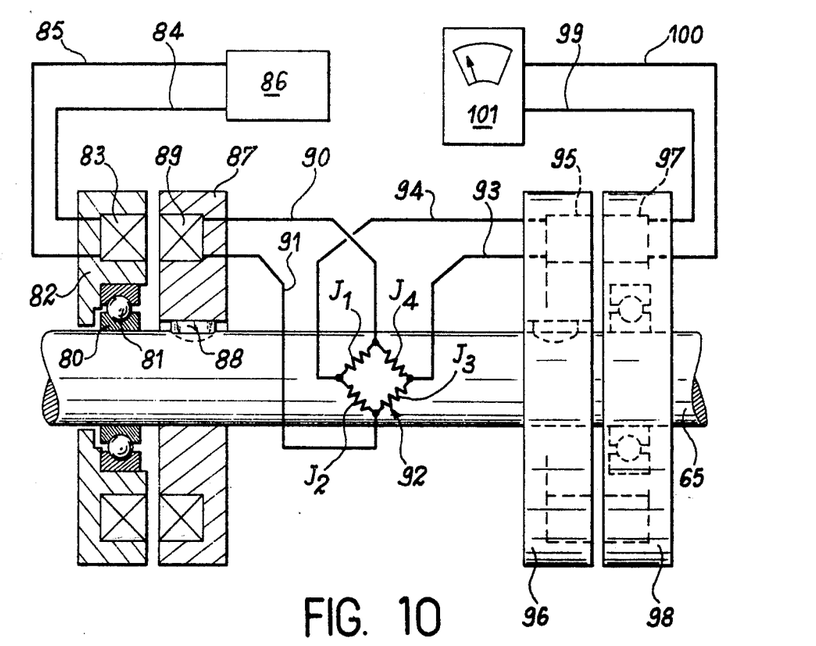
FIGS. 10 and 11 relate to yet another embodiment for reading the indications supplied by the strain gages.
Figure 11:
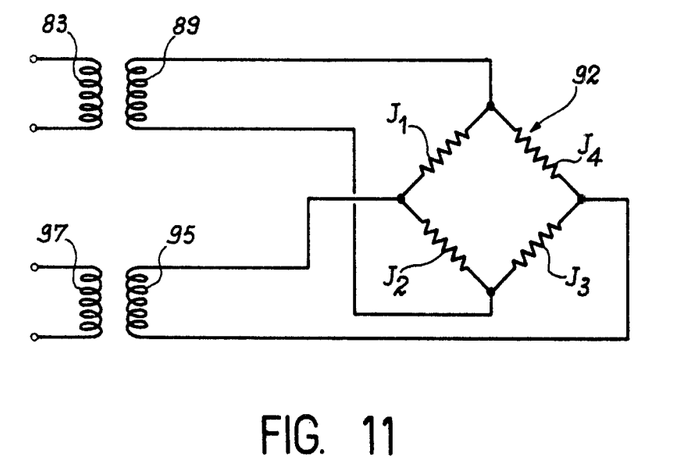

In another alternative embodiment which is illustrated in FIGS. 10 and 11, the shaft 65 which carries the four strain gages $J_1$ to $J_4$ is equipped with a mutual-inductance commutator which avoids the need to employ sliding contacts as in the previous embodiment. In this alternative form of construction, the shaft 65 is rotatably mounted by means of a bearing 80 and balls 81 within a stationary casing 82 which supports a primary annular inductance winding 83. Said winding is supplied through leads 84 and 85 from a suitable voltage source 86. A second casing 87 joined to the shaft 65 by means of keys 88 is mounted opposite to the stationary casing 82. Said casing 87 supports a secondary inductance winding 89 connected by means of leads 90 and 91 to the input terminals of a bridge circuit 92 of the four strain gages $J_1$ to $J_4$ as illustrated in FIG. 11. The two other terminals of the bridge 92 are connected by leads 93 and 94 to a second secondary winding 95 which is also carried by a casing 96, said casing being keyed on the shaft 65 in the same manner as the casing 87. Finally, provision is made opposite to the winding 95 for another primary winding 97 carried by a stationary casing 98, said winding 97 being connected by leads 99 and 100 to a measuring apparatus 101. The unbalance of the bridge produced by a variation in resistance of one of the strain gages can thus be immediately detected without any need for material contacts between the stationary portion and the rotating portion.

The monitoring device which is thus provided offers maximum safety. In particular, failure of one of the strain gages does not have any direct incidence on the operation of the control rods. The range of travel of the device is practically negligible, does not affect the guiding of the control rods and is insensitive to environmental conditions within the reactor. Finally, the device readily permits remote measurements while eliminating unwanted influences and taking into account only the weighing of the control rods and of the moving portions of the control rod drive mechanisms.

It will be readily apparent that the invention is not limited solely to the examples of construction described in the foregoing with reference to the accompanying drawings but extends on the contrary to all alternative forms.

What we claim is:

1. A monitoring device for nuclear reactor control rods including an assembly for the continuous weighing of a control rod and at least the moving portion of a rod-position control mechanism, comprising at least one strain gage and a circuit for said strain gage for measuring the electrical resistance of said gage which resistance varies with elongation of said strain gage, said elongation being a function of the weight to be measured, a drive mechanism of the screw-and-nut type for said control rod, said mechanism being carried on a fixed reference plane by a supporting head applied against beams inset at a stationary extremity with respect to said reference plane, said mechanism being subjected to bending stress under the action of the weight of said control rod and said drive mechanism, at least one strain gage for each of said beams extending in the longitudinal direction of said beam between the inset extremity thereof and a point of application of said supporting head against the other extremity of said beam.

2. A monitoring device according to claim 1, wherein each beam has a solid extremity for insetting said beam with respect to the reference plane, a central portion having a triangular profile for ensuring isoflexion of the strain gages and a free extremity remote from the solid extremity on which the supporting head is carried by a ball, the force produced by the weight of the control rod and of its drive mechanism and applied to the beam being thereby established in an accurate manner.

3. A monitoring device according to claim 1 wherein the strain gages are of the type comprising an etched grid of metal foil, said strain gages being protected by an insulating sheath and bonded to at least one face of the central portion of the beams.

4. A monitoring device according to claim 1, wherein the strain gages are four in number on each beam, said beams being in turn three in number and uniformly spaced around the supporting head.

5. A monitoring device according to claim 4, wherein the four strain gages on each beam are mounted as a bridge in the measuring circuit.

6. A monitoring device for nuclear reactor control rods including an assembly for the continuous weighing of a control rod and at least the moving portion of a rod-position control mechanism, comprising at least one strain gage and a circuit for said strain gage for measuring the electrical resistance of said gage which resistance varies with elongation of said strain gage, said elongation being a function of the weight to be measured, a drive mechanism of the screw-and-nut type for said control rod, said mechanism being carried on a fixed reference plane by a supporting head applied against beams inset at a stationary extremity with respect to said reference plane, said mechanism being subjected to bending stress under the action of the weight of said control rod and said drive mechanism, at least one strain gage for each of said beams extending in the longitudinal direction of said beam between the inset extremity thereof and a point of application of said supporting head against the other extremity of said beam, a drive mechanism of the rack and pinion type for said control rod, a driving shaft for said pinion, an assembly for measuring the torque exerted by the weight of said control rod and of said rack connected to said shaft, said strain gages being of the etched metal-foil grid type bonded to said pinion shaft and spaced at 45° in oppositely-facing relation in pairs to eliminate the effects of bending and tensile stresses, said strain gages being mounted as a bridge in said circuit.

7. A monitoring device according to claim 6, wherein the torque-measuring assembly is mounted with a clutch unit provided between the pinion and a driving motor.

8. A monitoring device according to claim 6, wherein the strain gages are connected to slip-rings fitted on the shaft and associated with sliding or fluid contacts on said slip-rings.

9. A monitoring device according to claim 6, wherein the torque-measuring assembly comprises a mutual-inductance commutator.

* * * * *